United States Patent
Tolinski et al.

(10) Patent No.: US 6,494,528 B2
(45) Date of Patent: Dec. 17, 2002

(54) RETRACTABLE ROOF PANEL

(75) Inventors: Roch J. Tolinski, Howell, MI (US); Steven J. Engelgau, Royal Oak, MI (US)

(73) Assignee: Meritor Light Vehicle Technology, LLC, Troy, MI (US)

(*) Notice: Subject to any disclaimer, the term of this patent is extended or adjusted under 35 U.S.C. 154(b) by 0 days.

(21) Appl. No.: 09/989,361

(22) Filed: Nov. 20, 2001

(65) Prior Publication Data

US 2002/0060479 A1 May 23, 2002

Related U.S. Application Data

(63) Continuation of application No. 09/876,519, filed on Jun. 7, 2001.
(60) Provisional application No. 60/252,238, filed on Nov. 20, 2000.

(51) Int. Cl.[7] .................................................. B60J 7/053
(52) U.S. Cl. ........................... 296/216.04; 296/216.05; 296/216.08; 296/222
(58) Field of Search ........................ 296/216.04, 216.05, 296/216.07, 216.08, 222

(56) References Cited

U.S. PATENT DOCUMENTS

| | | | |
|---|---|---|---|
| 2,203,931 A | | 6/1940 | Solomon |
| 3,612,601 A | * | 10/1971 | Himka et al. .................. 296/51 |
| 4,043,590 A | | 8/1977 | Pizzuti |
| 4,063,774 A | * | 12/1977 | Hanks .................... 296/216.04 |
| 4,152,872 A | * | 5/1979 | Tanizaki et al. ............ 296/155 |
| 4,272,121 A | * | 6/1981 | Kim ................... 296/216.04 X |
| 4,312,533 A | | 1/1982 | Jardin et al. |
| 4,630,858 A | * | 12/1986 | Bez ....................... 296/216.04 |
| 4,647,106 A | | 3/1987 | Furst |
| 4,659,140 A | | 4/1987 | Fuerst |
| 4,718,714 A | | 1/1988 | Tanino et al. |
| 4,802,707 A | | 2/1989 | Schlapp |
| 4,826,387 A | | 5/1989 | Audet |
| 4,923,245 A | | 5/1990 | Kuwabara |
| 5,046,779 A | | 9/1991 | Ichinose et al. |
| 5,069,501 A | | 12/1991 | Baldwin et al. |
| 5,090,767 A | | 2/1992 | Schreiter et al. |
| 5,114,208 A | | 5/1992 | Ikeda et al. |
| 5,197,779 A | | 3/1993 | Mizuno et al. |
| 5,362,122 A | | 11/1994 | Reihl et al. |
| 5,375,904 A | | 12/1994 | Huyer |
| 5,405,185 A | | 4/1995 | Cheron et al. |
| 5,417,358 A | | 5/1995 | Haselgrove |
| 5,464,267 A | | 11/1995 | Rachine et al. |
| 5,558,388 A | | 9/1996 | Furst et al. |
| 5,673,831 A | | 10/1997 | Spratt |

(List continued on next page.)

FOREIGN PATENT DOCUMENTS

| | | | | |
|---|---|---|---|---|
| FR | 1431241 | * | 1/1966 | .................. 296/222 |
| JP | 406191436 | * | 7/1994 | ............ 296/216.04 |

*Primary Examiner*—Dennis H. Pedder
(74) *Attorney, Agent, or Firm*—Carison, Gaskey & Olds

(57) ABSTRACT

A vehicle is provided that includes a roof with a roof opening and a rear body portion with a rear opening. Spaced apart guide rails are supported on an exterior surface of the roof. A retractable roof panel is supported on the guide rails by guide members that move along the guide rails along a path. The roof opening and the roof panel extend to the rearward end where the roof panel defines a rear header. The retractable roof panel may be driven from a closed positioned forward to an open position where the roof panel is adjacent to the exterior surface of the roof. The rear gate assembly, which is arranged in the rear opening, may be opened to provide access to the rear cargo area of the vehicle. With the rear gate assembly and retractable roof panel open, large items may be slid into the cargo area and may extend above the plane of the roof.

18 Claims, 7 Drawing Sheets

U.S. PATENT DOCUMENTS

| | | |
|---|---|---|
| 5,746,475 A | 5/1998 | Caye et al. |
| 5,775,769 A | 7/1998 | Reihl et al. |
| 5,791,728 A | 8/1998 | Hausrath |
| 5,884,824 A | 3/1999 | Spring, Jr. |
| 5,951,100 A | 9/1999 | Ewing et al. |
| 6,012,768 A | 1/2000 | Nabuurs et al. |
| 6,036,259 A | 3/2000 | Hertel et al. |
| 6,056,352 A | 5/2000 | Ewing et al. |
| 6,062,637 A | 5/2000 | Hoffmann |
| 6,065,793 A | 5/2000 | Koshida et al. |
| 6,068,168 A | 5/2000 | Kreisler |
| 6,073,994 A | 6/2000 | Jardin et al. |
| 6,305,740 B1 * | 10/2001 | Staser et al. ............... 296/222 |

\* cited by examiner

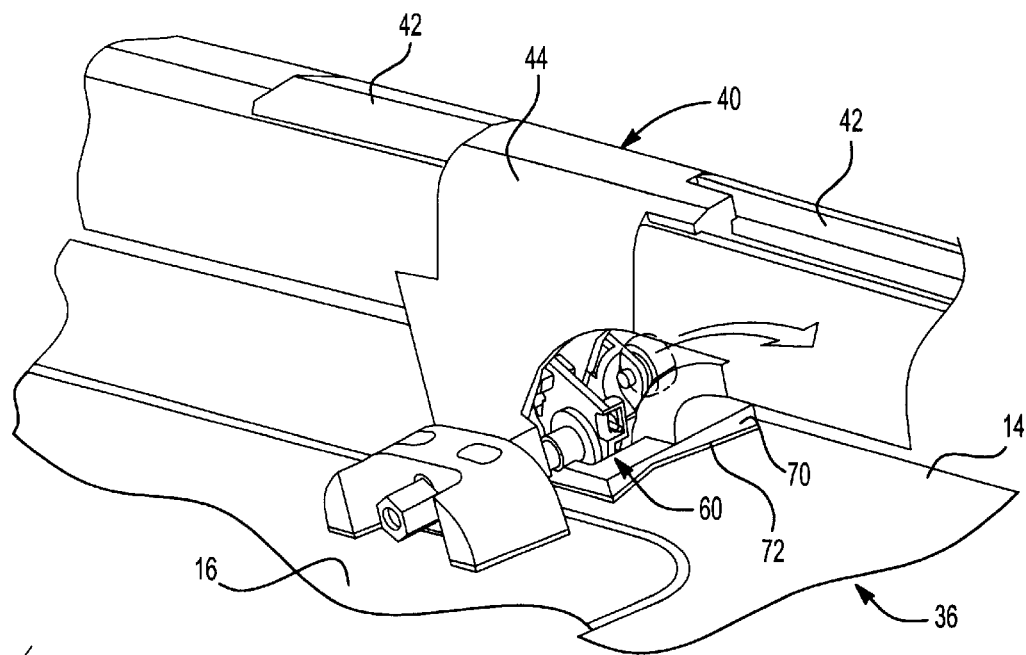
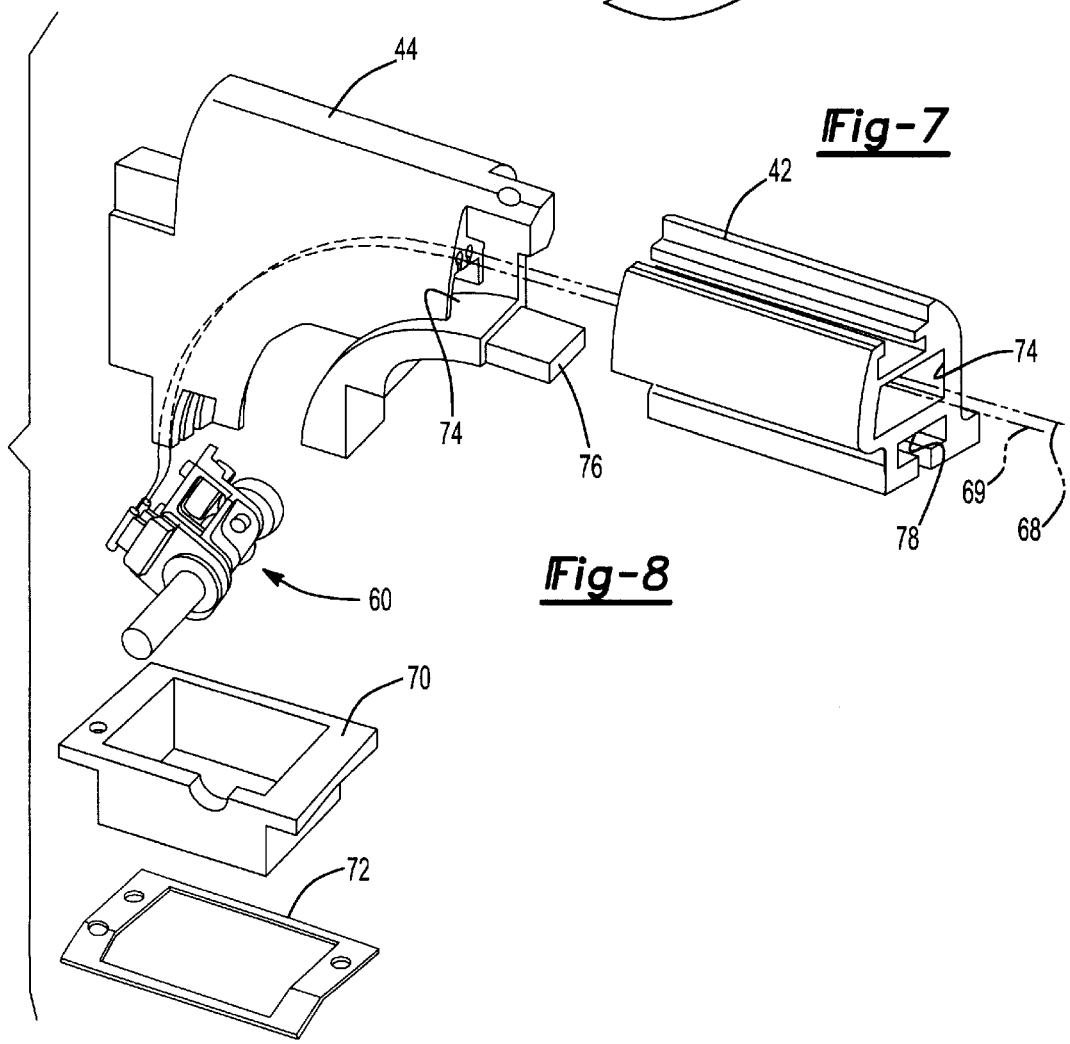

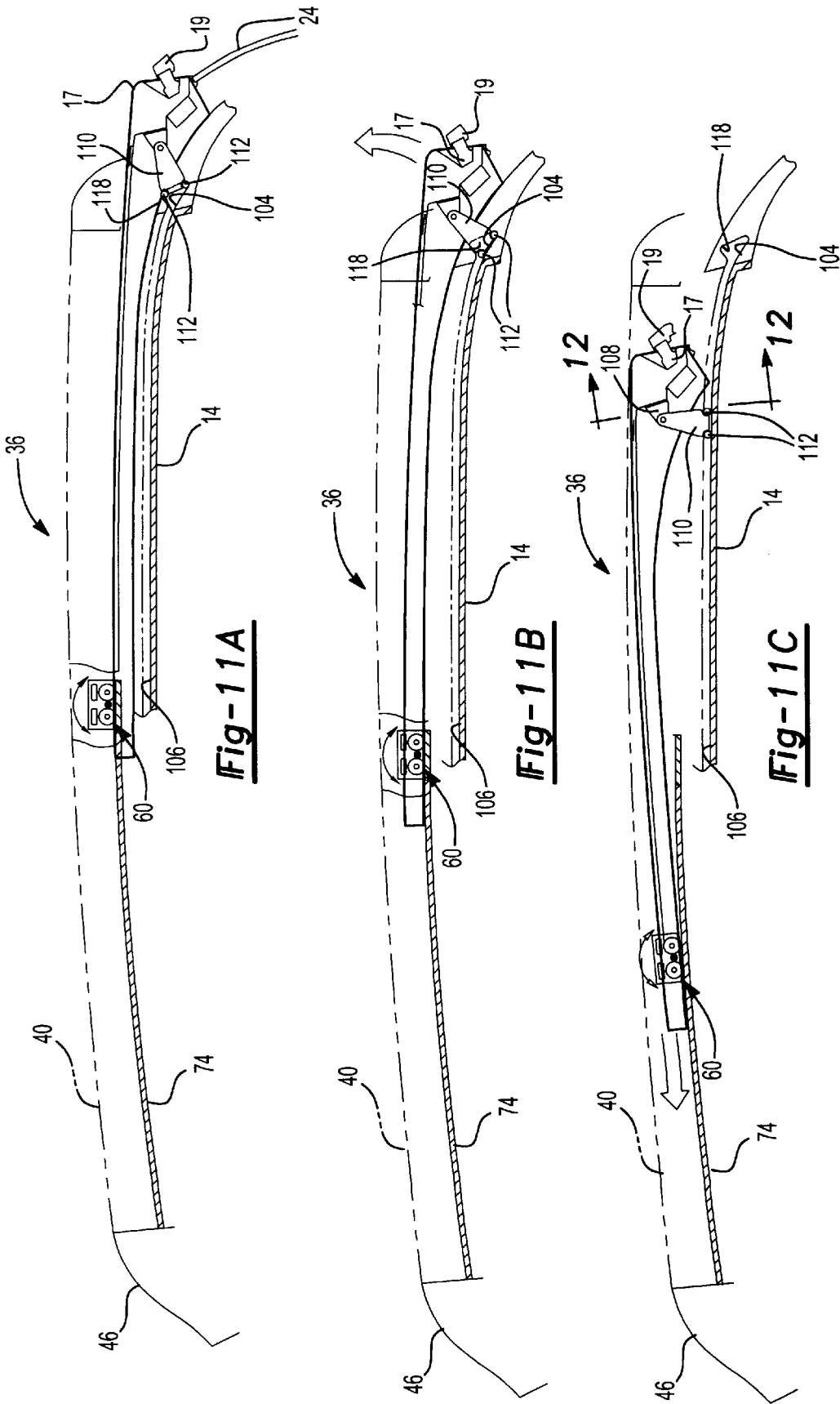

RETRACTABLE ROOF PANEL

RELATED APPLICATIONS

This application claims priority to Provisional Application No. 60/252,238, filed Nov. 20, 2000 and is a continuation of U.S. patent application Ser. No. 09/876,519, filed Jun. 7, 2001.

BACKGROUND OF THE INVENTION

This invention relates to a roof assembly for a vehicle, and more particularly, the invention relates to a retractable roof panel that includes the rear header of the vehicle for providing improved access to the rear cargo area of the vehicle when the roof panel is retracted.

Sunroofs are desireable features to many vehicle customers. Sunroofs are typically arranged in an area above the driver and front passenger seats. The sunroof maybe be retracted to expose the interior of the vehicle to the environment and permit air and light to enter the vehicle. Typically, the opening for the sunroof is relatively small, and sunroofs have not been used to provide increased access to the interior of the vehicle. They have simply been used to provide a more pleasant driving experience to the vehicle occupants.

Once sunroofs are moved from the closed position to an open position, the sunroof is typically stowed in a area between the interior of the roof structure and an interior trim headliner. That is, the sunroof is stowed using the interior space of the vehicle such that it impinges upon the passenger's headroom. The larger the vehicle sunroof, the more problematic it may become to stow the sunroof. Significant vehicle design changes may be required to maintain occupant headroom. As a result, it is desireable to stow a sunroof in the open position in such a manner that interior space is not reduced.

Therefore, what is needed is a sunroof that does not impinge upon passenger headroom or reduce the interior space in the vehicle. Furthermore, what is needed is a sunroof that provides increased access to the cargo area within the vehicle such that loading and unloading of the vehicle is simplified and larger cargo items may be placed inside the vehicle.

SUMMARY OF THE INVENTION AND ADVANTAGES

The present invention provides a vehicle having a roof with a roof opening and a rear body portion with a rear opening. Spaced apart guide rails are supported on an exterior surface of the roof. A retractable roof panel is supported on the guide rails by guide members that move along the guide rails along a path. The roof opening and the roof panel extend to the rearward end where the roof panel defines a rear header. The retractable roof panel may be driven from a closed position forward to an open position where the roof panel is adjacent to the exterior surface of the roof. The rear gate assembly, which is arranged in the rear opening, may be opened to provide access to the rear cargo area of the vehicle. With the rear gate assembly and retractable roof panel open, large items may be slid into the cargo area and may extend above the plane of the roof.

Accordingly, the above invention provides a sunroof that does not impinge upon passenger headroom or reduce the interior space in the vehicle. Furthermore, a sunroof is provided that increases access to the cargo area within the vehicle such that loading and unloading of the vehicle is simplified and larger cargo items may be placed inside the vehicle.

BRIEF DESCRIPTION OF THE DRAWINGS

Other advantages of the present invention can be understood by reference to the following detailed description when considered in connection with the accompanying drawings wherein:

FIG. 7 is an enlarged perspective view of a guide member and guide rail with front roller mechanism;

FIG. 8 is an exploded view of the guide rail and guide member shown in FIG. 7;

FIG. 11a is a cross-sectional view of roof panel in the closed position;

FIG. 11b is a cross-sectional view of the roof panel in a partially open position;

FIG. 11c is a cross-sectional view of the roof panel moving toward the open position.

DETAILED DESCRIPTION OF THE PREFERRED EMBODIMENT

Figure 1:
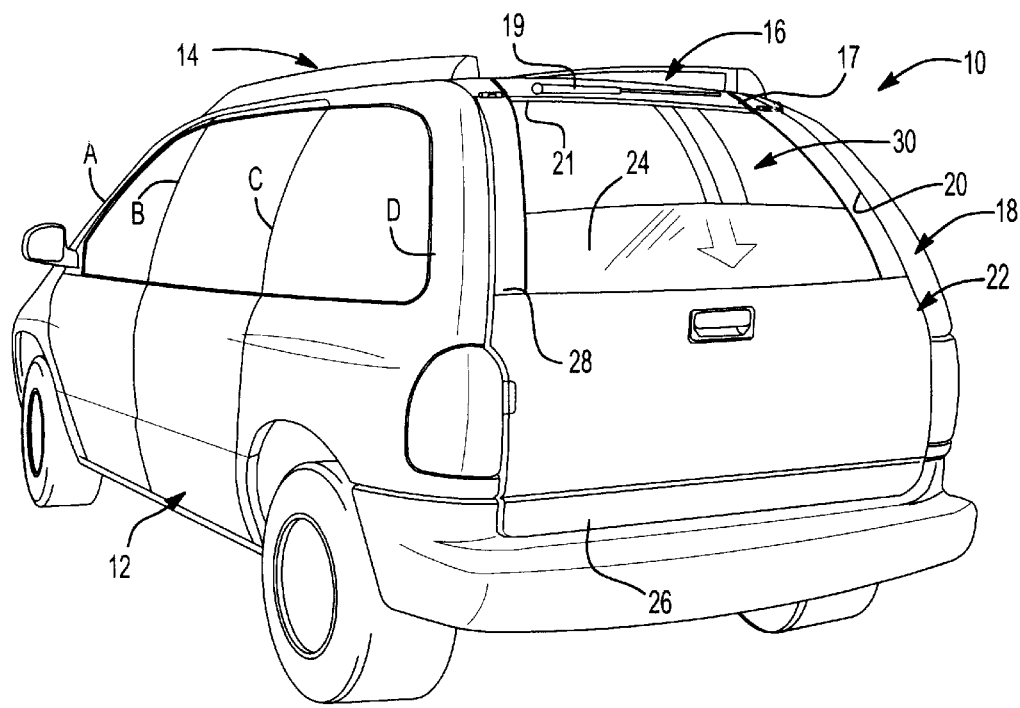
FIG. 1 is a rear perspective view of the present invention vehicle with the rear window partially open.
Figure 2:
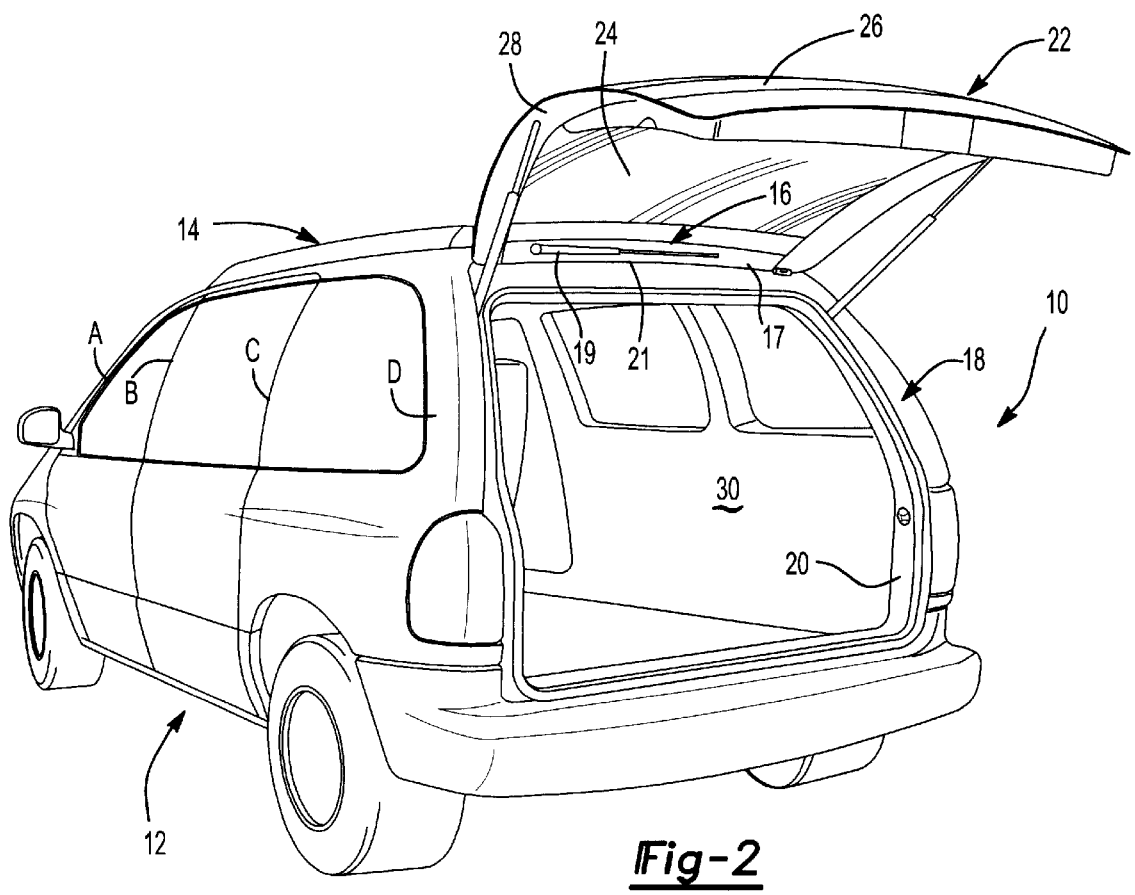
FIG. 2 is a rear perspective view of the present invention vehicle with the window partially open and the rear gate assembly pivoted upward to an open position.
Figure 3:
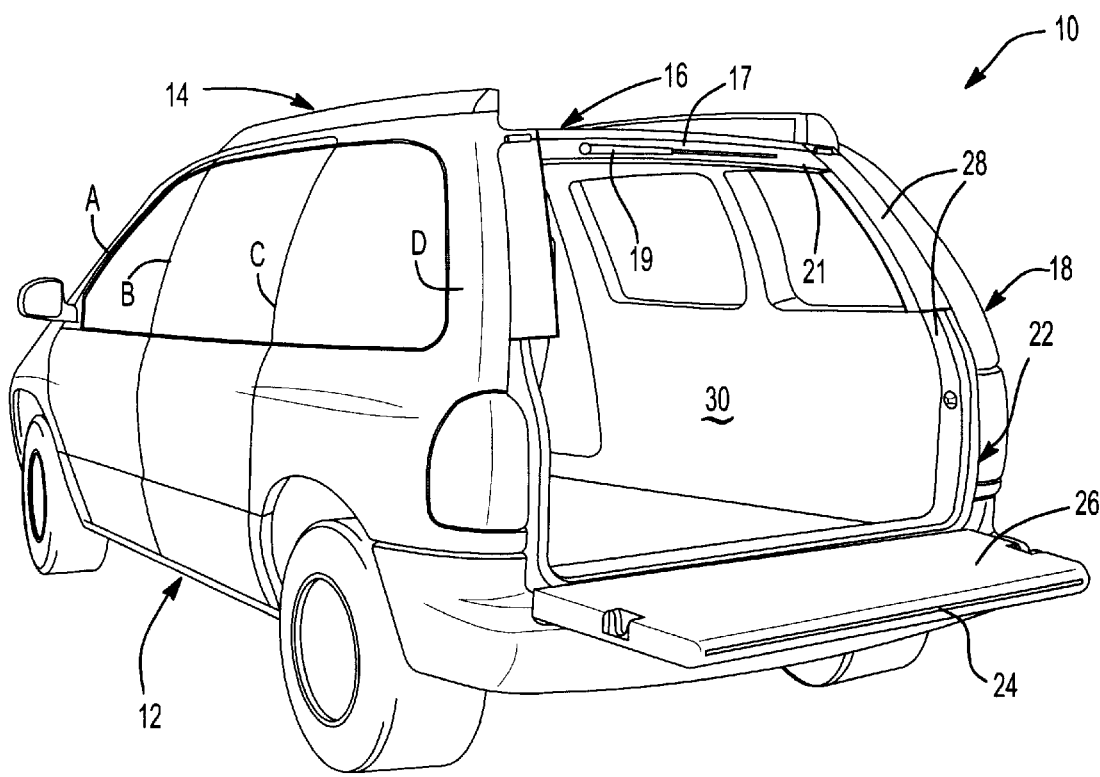
FIG. 3 is a rear perspective view of the present invention vehicle with the tailgate of the rear gate assembly pivoted downward.

A vehicle 10 utilizing the present invention is shown in FIGS. 1–3. The vehicle 10 shown has a four-door body 12 that includes A, B, C, D pillars. The body 12 has a roof 14 that includes the present invention retractable roof panel 16. The roof panel 16 has a rear header 17, which may commonly be referred to as a D pillar header for the four-door vehicle shown. A wiper 19 may be mounted to the rear header 17.

A rear body portion 18 defines a rear opening 20. A rear gate assembly 22 is mounted on the rear body portion 18 to enclose the rear opening 20. The gate assembly 20 may include a frame 28 supporting a lower body or tail gate 26 and a window 24. However, it is to be understood that any arrangement may be used for the rear gate assembly 22. As shown in FIG. 1, the window 24 may be lowered from an upper boundary 21 defined by the rear header 17 into the lower body 26 to provide partial access to the cargo area 30 or for manipulating the roof panel 16 during opening and closing. As shown in FIG. 2, the window and tailgate 26 may move pivotally upward with the frame 28 to act as a lift gate. For configurations in which the wiper 19 is mounted to the rear header 17, the window 24 may be partially opened to ensure clearance of the wiper 19. As shown in FIG. 3, the frame 28 may remain secured to the rear body portion 18 to manipulate the tail gate 26. The window 24 may be lower into the tail gate 26, and the tail gate may be rotated downward to permit access to the cargo area 30 of the interior cabin so that objects may be easily slid into the rear of the vehicle. It can be appreciated that the present invention vehicle, as shown in FIGS. 1–3, functions to permit cargo of a relatively limited height to be stored in the cargo area 30 of the vehicle 10.

Figure 4:
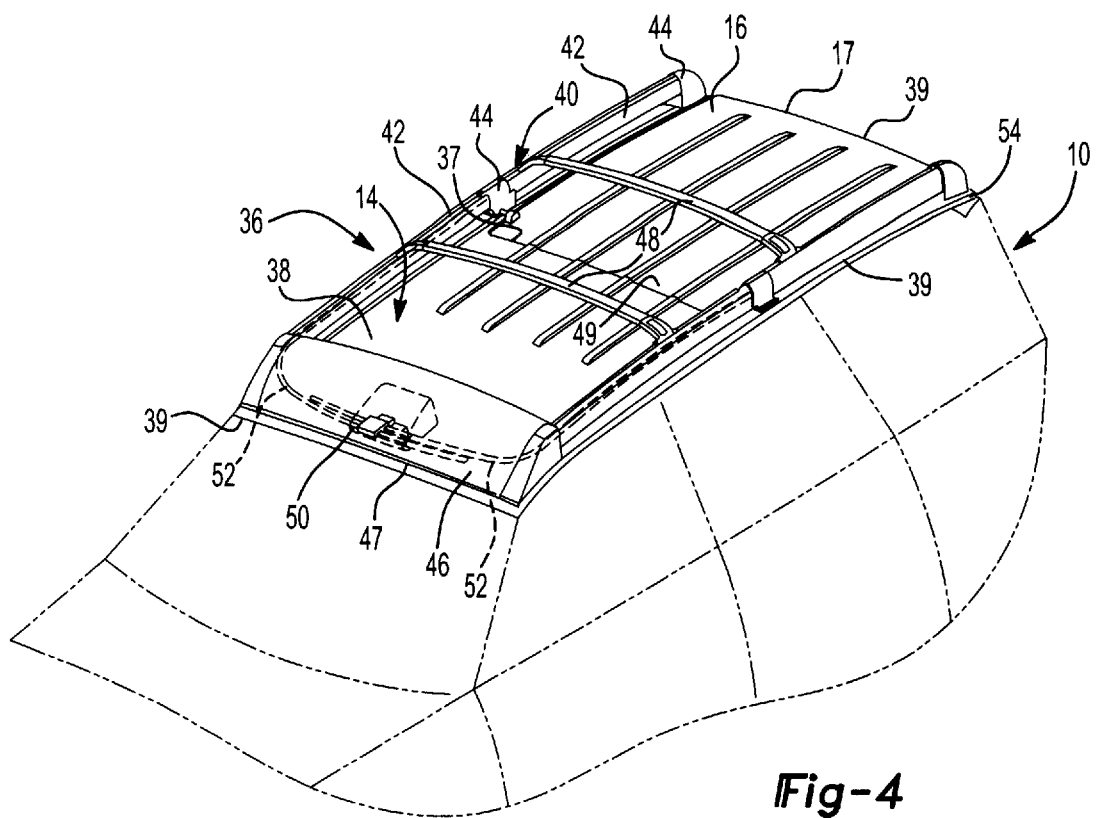
FIG. 4 is a front perspective view of the present invention retractable roof in a closed position.
Figure 5:
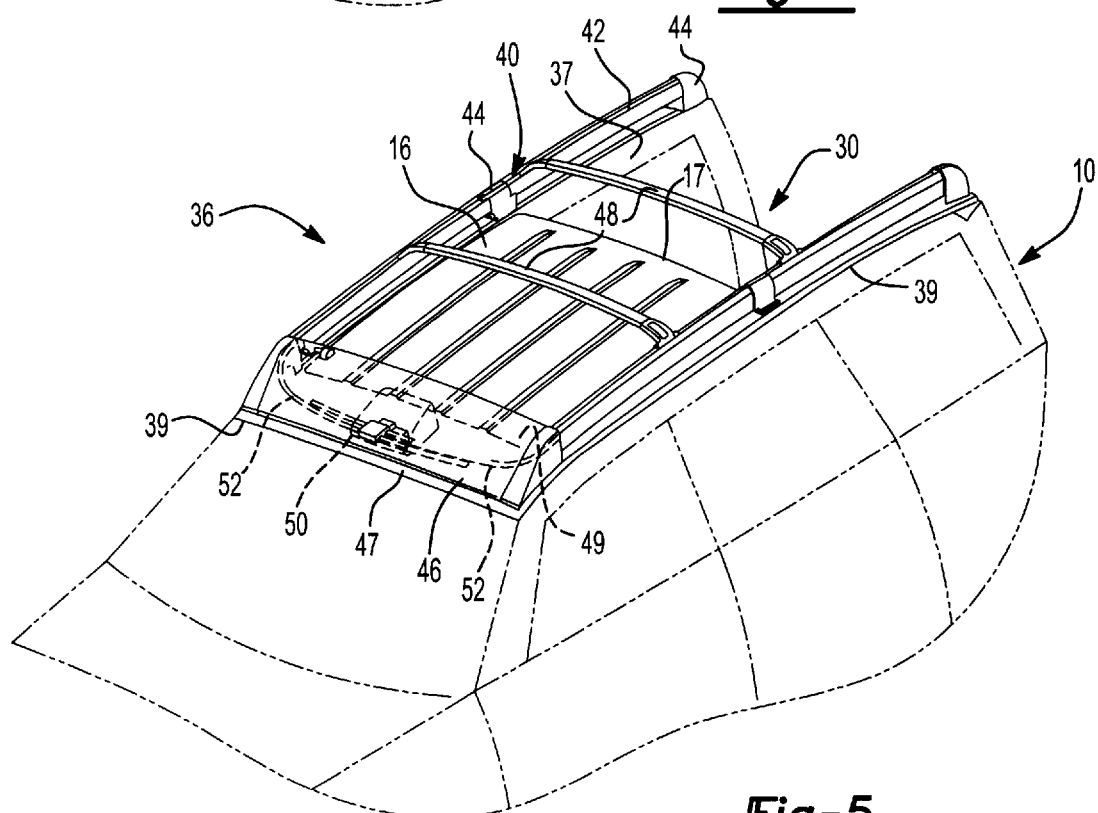
FIG. 5 is a front perspective view of the present invention retractable roof in an open position.
Figure 6:
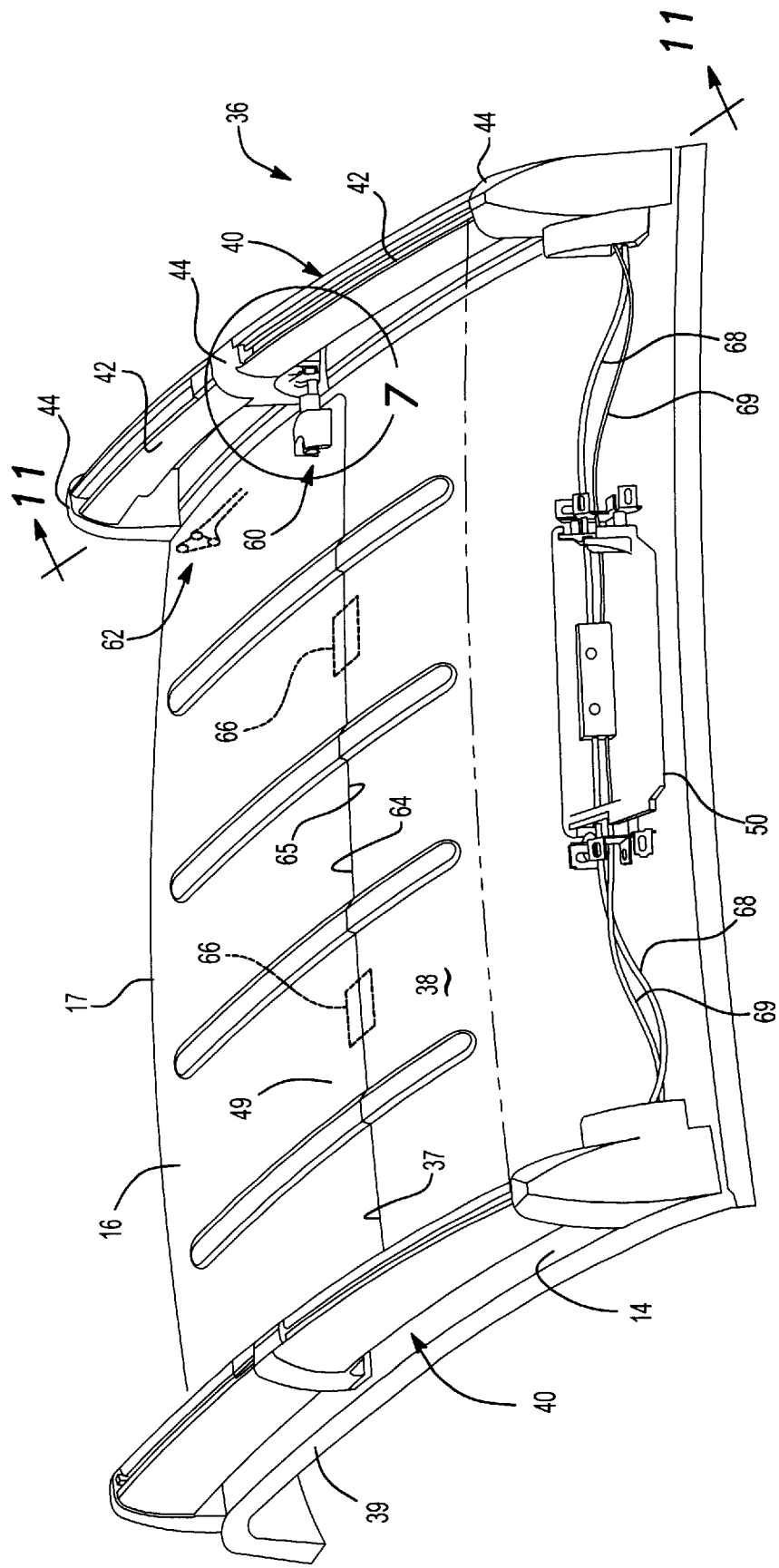
FIG. 6 is a front perspective view of the present invention roof assembly.

Referring to FIGS. 4–6, the roof 14 may be provided by a roof assembly 36 that may be secured to the rest of the vehicle body during assembly of the vehicle 10. The roof assembly 36 may include all of the features discussed below in addition to other features and interior trim such as head liner and dome lights, etc. The roof assembly 36 includes the roof 14 that defines a generally U-shaped roof opening 37, best seen in FIG. 5. The roof panel 16 is a rigid unitary structure that is preferably constructed from a fiber reinforced polymer material. The roof 14 may also be a fiber reinforced polymer material or may be stamped steel. The roof assembly 36 has a perimeter 39 of which the rear header 17 defines the rearward end 54 of the perimeter 39. The roof 14 includes guide rails 40 that define a path of the roof panel 16. The guide rails 40 are mounted to the exterior surface 38 of the roof 14. The guide rails include longitudinal members 42 that are secured to the roof 14 by support members 44. Luggage racks 48 may be arranged laterally between the guide rails 40.

A wind deflector 46 may be arranged at a forward end 47 of the roof 14 to direct wind over the roof panel 16 when the roof panel 16 is in the open position, as shown in FIG. 5. A motor 50 may be mounted on the exterior surface 38 of the roof 14 beneath the wind deflector 46. Drive cables 52 may be coupled to a portion of the roof panel 16 and connected to the motor 50 driving the roof panel 16 between the closed position (shown in FIG. 4) and the open position (shown in FIG. 5). The cables 52 may have a helical outer member typical of the type used in sunroofs.

The roof panel 16 of the present invention is stowed on the outside of the vehicle 10 adjacent to the exterior surface 38. The lower portion 49 of the roof panel 16 may be arranged partially under the wind deflector 46 with the roof panel 16 beneath the luggage racks 48. Unlike typical sunroof assemblies, the present invention roof panel 16 moves from the rearward end 54 of the vehicle to the forward end 47 of the vehicle. Additionally, the roof panel 16 includes the rear header 17 such that when the roof panel 16 is moved to the open position and the rear gate assembly 22 is moved to the open position very large items that may extend beyond the plane of the roof 14 may be placed easily into the cargo area 30.

Referring to FIG. 6, the roof panel 16 is shown supporting the forward portion 49 in the guide rails 40 by guide members 60. Rear guide member 62 support the rear of the roof panel 16 on the roof 14, which will be discussed in more detail below. The forward portion of the roof opening 37 includes a first wall portion 64. The forward portion 49 of the roof panel 16 includes a second wall portion 65 that is adjacent to the first wall portion 64 when the roof panel 16 is in the closed position. A latch assembly 66 is mounted underneath the wall portions 64 and 65. The latch may be arranged in any suitable location. The latch assembly 66 locks the roof panel 16 to the roof 14 where the roof is in the closed position. Preferably, two spaced apart latch assembly 66 are used to reduce the stress on the roof panel 16.

Figure 9:
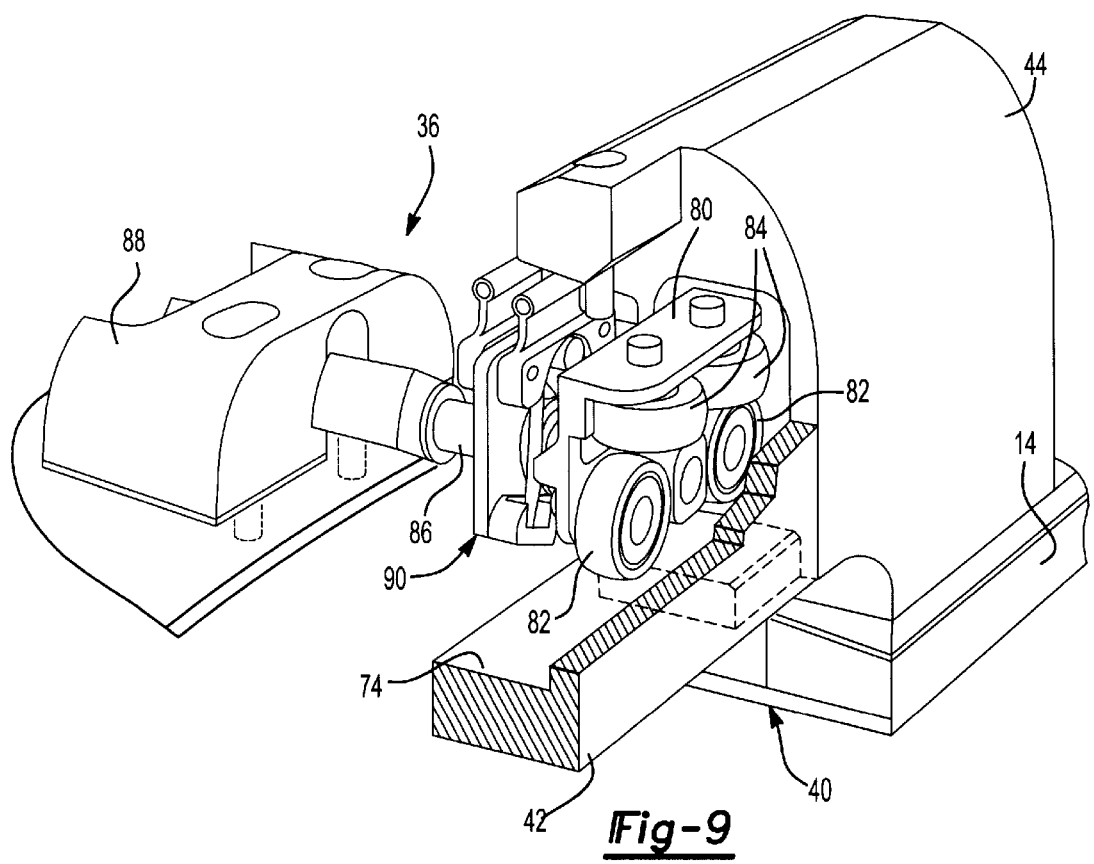
FIG. 9 is a perspective view of the guide member roller mechanism.
Figure 10:
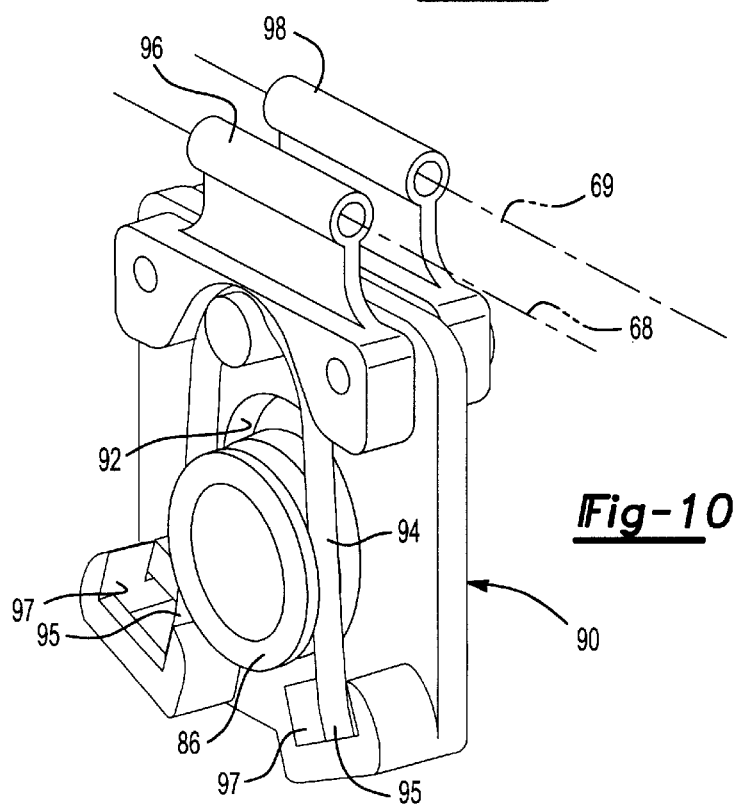
FIG. 10 is a perspective view of the guide member bracket assembly.

Referring to FIGS. 7–9, the forward guide members 60 are received within the center support members 44. The guide members 60 travel along a path in the longitudinal members 42 and support members 44 defined by a channel 74. For the embodiment shown, the rear longitudinal members 42 are for aesthetics and do not support the roof panel 16. As shown in FIG. 8, the support member 44 includes a pocket 70 received in a recess in the roof 14 (not shown) and sealed thereto by a gasket 72. As the roof panel 16 moves from the closed position to the open position the guide members 60 travel up along the channel 74 defined in the support member 44 to raise the forward portion 49 of the roof panel 16. The longitudinal 42 and support 44 members are secured to one another using a tongue 76 and groove 78 arrangement and fasteners (now shown). The drive cables 68 and wires 69 may be routed through the channel 74 and carried by a portion of the guide member 60. The wires may be routed to a rear brake light and/or the wiper 19.

Referring to FIG. 9, a guide member 60 includes a cage 80 that carries a pair of first rollers 82 rotatable about horizontal axles and second rollers 84 rotatable about vertical axes. The first rollers 82 carry the load of the roof panel 16 on the bottom of the channel 74. The second rollers 84 may ride a long a side of the channel 74 to minimize friction during any vibration of the roof panel 16 as it moves between the open and closed positions. However, it is to be understood that any number and configuration of rollers may be used. The cage 80 includes a lateral member 86 that extends from the cage 82 a block 88 that is secured to the roof panel 16. The lateral member 86 may include a damper to further minimize roof panel vibrations.

A bracket 90 having a generally vertical elongated aperture 92 is arranged between the cage 80 and the roof panel 16 with the lateral member 86 disposed within the aperture 92. The aperture 92 permits the rollers 82 and 84 and cage 80 to move upward if the first rollers 82 must travel over debris trapped on the bottom of the channel 74. A biasing member 94 or spring normally urges the lateral member 86 downward in Me aperture 92. Opposing ends 95 of the spring 94 are retained with retaining pockets 97. The drive cable 68 and wires 69 may be respectively mounted on cable mounts 96 and wire mounts 98 secured to the bracket 90 The motor 50 pulls the roof panel 16 forward to the open position. The roof panel 16 is closed by pushing it and lowering it under the force of its own weight.

Figure 12:
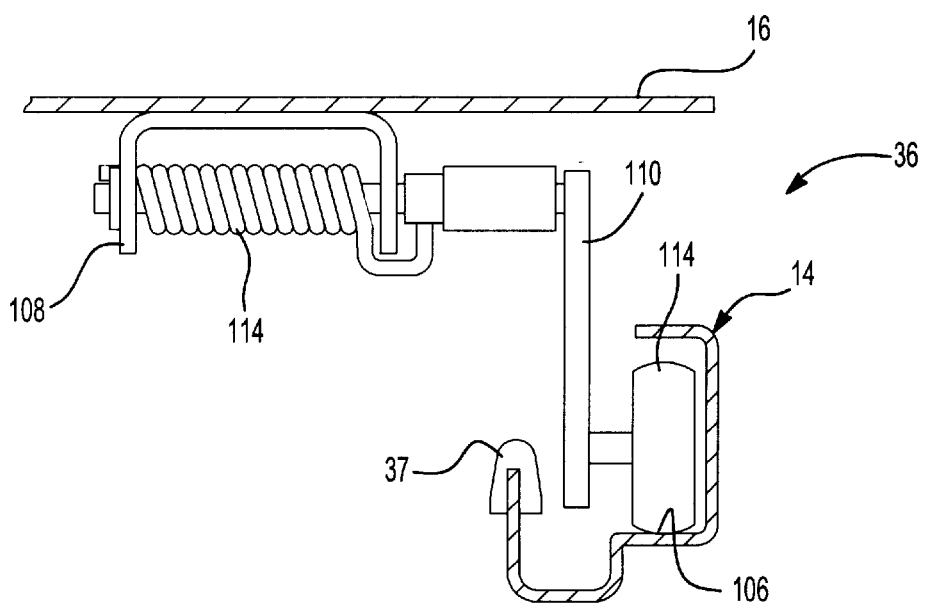
FIG. 12 is a cross-sectional view of a rear guide member.

A rear guide member 62 is best shown in FIGS. 11a–11c and 12. Unlike the forward guide member 60, the rear guide members 62 do not ride within the guide rails 40. However, it is to be understood that the rear guide member 62 may be configured such that they do ride within the guide rails 40 similar to the guide members 60. The rear guide member 62 rides along a rear aperture, which may defined by the roof assembly 36 or another portion of the vehicle 10, and a drain trough 106 which is defined by a channel arranged about the perimeter roof opening 37, which is best shown in FIG. 12. The rear guide member 62 includes a bracket 108 secured to the roof panel 16. The bracket 108 pivotally supports an arm 110 having rollers 112. A spring 114 biases the arm 110 forward away from the rear header 17. Referring to FIG. 11a, the roof panel 16 is show in a closed and locked position in which the arm 110 is tilted rearward with a roller 112 received in a recess 118 in the rear aperture 104. In this position, the rear of the roof panel 16 cannot be lifted until the roof panel is moved forward. As the roof panel 16 is moved forward, as shown in FIG. 11b, the arm 110 rotates forward as the roof panel 16. The spring 114 urges the arm 110 to unseat one of the rollers 112 from the recess 118. As the roof panel 16 continues to move forward, as shown in FIG. 11c, the rollers 112 move along the drain trough 106. The rear guide member 62 configuration provides enough lift to the rear of the roof panel 16 such that the roof panel 16 may clear the exterior surface 38 of the roof 14 when in the fully opened position.

In operation, the rear gate assembly 22 may be manipulated as described in relation to FIGS. 1–3 above to permit access to the cargo area 30. However, when increased access to the cargo area 30 is desired, for example for cargo items having a height that exceeds the plane of the roof 14, the roof panel 16 may be retracted. To retract the roof panel 16, the latch assembly 66 must be actuated to unlock the forward portion 49 of the roof panel 16 from the roof 14. The forward guide member 60 will begin to move up the channel 74 in the support member 44, and the rear guide member 62 will rotate forward such that one of the rollers 112 moves out of engagement with the recess 118. The forward guide member 60 will move along the channels 74 within the longitudinal member 42, and the rear guide member 62 and will move along the drain trough 106. The forward portion 49 of the roof panel 16 will preferably be disposed beneath wind deflector 46. Preferably when opening the retractable roof panel 16, the window 24 will be lowered into the lower body 26 to minimize the force on the window 24 when traveling along a road with the retractable roof panel 16 in the open position.

The invention has been described in an illustrative manner, and it is to be understood that the terminology that has been used is intended to be in the nature of words of description rather than of limitation. The vehicle 10 includes electronic hardware, software, and actuators typically available. The sequence used to open and close the roof panel 16 may be programmed and initiated by operation of a switch. Obviously, many modifications and variations of the present invention are possible in light of the above teachings. It is, therefore, to be understood that within the scope of the appended claims the invention may be practiced otherwise than as specifically described.

What is claimed is:

1. A roof assembly for a vehicle comprising:
   a roof having a roof opening extending to a rear of said roof, said roof having an exterior surface and forward and rearward ends;
   spaced apart glide rails supported on said exterior surface defining a path;
   a guide member received in each of said guide rails movable along said path, said guide member includes a roller assembly received within a channel in each of said guide rails, said roller assembly includes a first roller having a horizontal rotational axis and a second roller having a vertical rotational axis; and
   a retractable roof panel with a portion supported by said guide members and movable along said path from an open roof position to a closed roof position in which said roof panel is disposed within said roof opening, said roof panel defining a rear header at said rearward end with said rear header moving toward said forward end when moving between said closed and open roof positions, respectively.

2. The roof assembly according to claim 1, wherein said roof includes a perimeter with said rear header defining a portion of said perimeter in said closed roof position.

3. The roof assembly according to claim 1, wherein said roof generally defines a U-shape around said opening.

4. The roof assembly according to claim 1, herein a motor is on said exterior surface, said motor interconnected with said roof panel driving said roof panel between said closed and open roof positions.

5. The roof assembly according to claim 1, further including a wiper mounted on said rear header.

6. The roof assembly according to claim 1, wherein said roof panel is a unitary rigid structure.

7. The roof assembly according to claim 1, wherein roof includes a first wall portion defining a forward portion of said roof opening, and said roof panel includes a second wall portion adjacent to said first wall portion in said closed roof position with at least one latch assembly mounted between said wall portions locking said roof panel to said roof in said closed roof position.

8. The roof assembly according to claim 1, wherein said roller assembly includes a pair of each of said first and second rollers.

9. The roof assembly according to claim 1, wherein said guide member includes a cage supporting said rollers with a lateral member interconnecting said cage to said roof panel.

10. The roof assembly according to claim 9, wherein said lateral member includes a damper.

11. The roof assembly according to claim 9, wherein said guide member includes a bracket having an elongated generally vertical aperture with said lateral member disposed therein.

12. The roof assembly according to claim 11, wherein said guide member includes a biasing member urging said lateral member downward in said aperture.

13. The roof assembly according to claim 11, further including a drive cable attached to said bracket for moving said roof panel between closed and open roof positions.

14. The roof assembly according to claim 1, further including a luggage rack arranged between said guide rails with said roof panel interposed between said luggage rack and said exterior surface in said open roof position.

15. A roof assembly for a vehicle comprising:
   roof having a roof opening extending to a rear of said roof, said roof having an exterior surface and forward and rearward ends and a trough extending below the exterior surface on either side of said roof opening defining a path;
   spaced apart guide rails supported on said exterior surface;
   a guide member received in each of said troughs movable along said path; and
   a retractable roof panel with a rear portion supported by said guide members and movable along said path from an open roof position to a closed roof position in which said roof panel is disposed within said roof opening said roof panel defining a rear header at said rearward end with said rear header moving toward said forward end when moving between said closed and open roof positions, respectively.

16. The roof assembly according to claim 15, wherein said guide member includes at least two rollers.

17. The roof assembly according to claim 15, wherein said trough includes a recess transverse to said path defining a locked position.

18. The roof assembly according to claim 17, wherein said guide member includes an arm pivotal relative to said retractable roof panel with said arm supporting said at least two rollers, and a spring urging said arm from said closed position to an open position.

* * * * *

UNITED STATES PATENT AND TRADEMARK OFFICE
CERTIFICATE OF CORRECTION

PATENT NO. : 6,494,528 B2
DATED : December 17, 2002
INVENTOR(S) : Tolinski et al.

It is certified that error appears in the above-identified patent and that said Letters Patent is hereby corrected as shown below:

Column 5,
Line 63, "herein" should be -- wherein --;

Column 6,
Line 7, after "wherein" add -- said --;
Line 36, before "roof" insert -- a --;
Line 58, "17" should be -- 16 --.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,494,528 B2
DATED : December 17, 2002
INVENTOR(S) : Tolinski et al.

It is certified that error appears in the above-identified patent and that said Letters Patent is hereby corrected as shown below:

Title page,
Item [62], Related U.S. Application Data, "Continuation of" should be
-- Continuation-in-part of --

Column 1,
Line 5-6, "a continuation of" should be -- a continuation-in-part of --

Column2,
Line 52, "gate assembly 20" should be -- gate assembly 22 --
Line 66, "lower" should be -- lowered --

Column3,
Line 38, "lower portion 49" should be -- forward portion 49 --
Line 61, "roof 14 where" should be -- roof 14 when --

Column 4,
Lines 24-26, "The cage 80 includes a lateral member 86 that extends from the cage 82 a block 88 that is secured to the roof panel 16" should be -- The cage 80 includes a lateral member 86 that extends from the cage 80 to a block 88 that is secured to the roof panel 16. --
Line 35, "Me aperture 92" should be -- the aperture 92 --

Column 5,
Line 41, "glide" should be -- guide --

UNITED STATES PATENT AND TRADEMARK OFFICE
CERTIFICATE OF CORRECTION

PATENT NO. : 6,494,528 B2
DATED : December 17, 2002
INVENTOR(S) : Tolinski et al.

It is certified that error appears in the above-identified patent and that said Letters Patent is hereby corrected as shown below:

<u>Column 5 (continued),</u>
Lines 61-62, "from said closed position to an open position" should be -- from said closed position to said open position. --

Signed and Sealed this

Tenth Day of August, 2004

JON W. DUDAS
*Acting Director of the United States Patent and Trademark Office*